United States Patent
Rodriguez et al.

(10) Patent No.: US 9,522,698 B2
(45) Date of Patent: Dec. 20, 2016

(54) STEERING GEAR WITH TUNABLE HYDRAULIC BUSHINGS

(71) Applicant: GM GLOBAL TECHNOLOGY OPERATIONS LLC, Detroit, MI (US)

(72) Inventors: Marco E. Rodriguez, Macomb Township, MI (US); Hugh R. Tye-Dias, Waterford, MI (US); Benjamin S. Whybrew, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/042,667

(22) Filed: Feb. 12, 2016

(65) Prior Publication Data

US 2016/0339955 A1 Nov. 24, 2016

Related U.S. Application Data

(60) Provisional application No. 62/164,142, filed on May 20, 2015.

(51) Int. Cl.
*B62D 7/22* (2006.01)
*B62D 6/06* (2006.01)
*B62D 5/04* (2006.01)
*B62D 3/12* (2006.01)

(52) U.S. Cl.
CPC ............ *B62D 7/226* (2013.01); *B62D 6/06* (2013.01); *B60Y 2410/104* (2013.01); *B62D 3/12* (2013.01); *B62D 5/0421* (2013.01)

(58) Field of Classification Search
CPC ............ B62D 7/226; B62D 6/06; B62D 3/12; B62D 5/0421; B60Y 2410/104
See application file for complete search history.

(56) References Cited

U.S. PATENT DOCUMENTS

| | | | | |
|---|---|---|---|---|
| 3,505,898 A * | 4/1970 | Bradshaw | ................ | B62D 3/12 74/422 |
| 3,860,098 A * | 1/1975 | Porter | ................... | B60N 2/443 188/300 |
| 4,008,627 A * | 2/1977 | Bradshaw | ................ | B62D 3/12 74/498 |
| 6,619,420 B1* | 9/2003 | Saarinen | ................ | B62D 3/123 180/423 |
| 6,681,885 B2* | 1/2004 | Harer | ...................... | B62D 3/12 180/417 |
| 8,336,413 B2* | 12/2012 | Dodak | ..................... | B62D 3/12 188/267.1 |

(Continued)

*Primary Examiner* — Darlene P Condra
(74) *Attorney, Agent, or Firm* — Quinn Law Group

(57) ABSTRACT

A tunable hydraulic bushing mounts a steering gear to a vehicle frame member. The bushing is filled with a fluid and includes an inertia track and a pressure valve separating first and second fluid chambers or cavities. The inertia track provides uninterrupted fluid communication between the first cavity and the second cavity. The pressure valve is movable between an open position, which allows fluid communication though the pressure valve between the first cavity and the second cavity, and a closed position, which blocks fluid communication though the pressure valve between the first cavity and the second cavity. The pressure valve may be configured to be closed during loads induced by smooth road shake and open during loads greater than smooth road shake.

8 Claims, 3 Drawing Sheets

(56) References Cited

U.S. PATENT DOCUMENTS

2013/0024070 A1\* 1/2013 Yu .......................... B62D 3/12
                                                    701/37
2014/0325791 A1\* 11/2014 Colverson ............ F16J 15/3404
                                                    16/2.2

\* cited by examiner

STEERING GEAR WITH TUNABLE HYDRAULIC BUSHINGS

CROSS-REFERENCE TO RELATED APPLICATIONS

This application claims the benefit of U.S. Provisional Application No. 62/164,142, filed May 20, 2015, which is hereby incorporated by reference in its entirety.

TECHNICAL FIELD

This disclosure generally relates to bushings for mounting steering gears or steering assemblies to vehicle frames.

BACKGROUND

Vehicular steering systems translate directional commands of an operator into steerable wheels, which are in contact with the road, of a vehicle.

SUMMARY

A tunable hydraulic bushing for mounting a steering gear to a vehicle frame member is provided. The bushing is filled with a fluid and includes at least an inertia track and a pressure valve separating first and second fluid chambers or cavities. The inertia track provides uninterrupted fluid communication between the first cavity and the second cavity.

The pressure valve is movable between an open position, which allows fluid communication though the pressure valve between the first cavity and the second cavity, and a closed position, which blocks fluid communication though the pressure valve between the first cavity and the second cavity. The pressure valve is configured to be closed during loads induced by smooth road shake and open during loads greater than smooth road shake.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
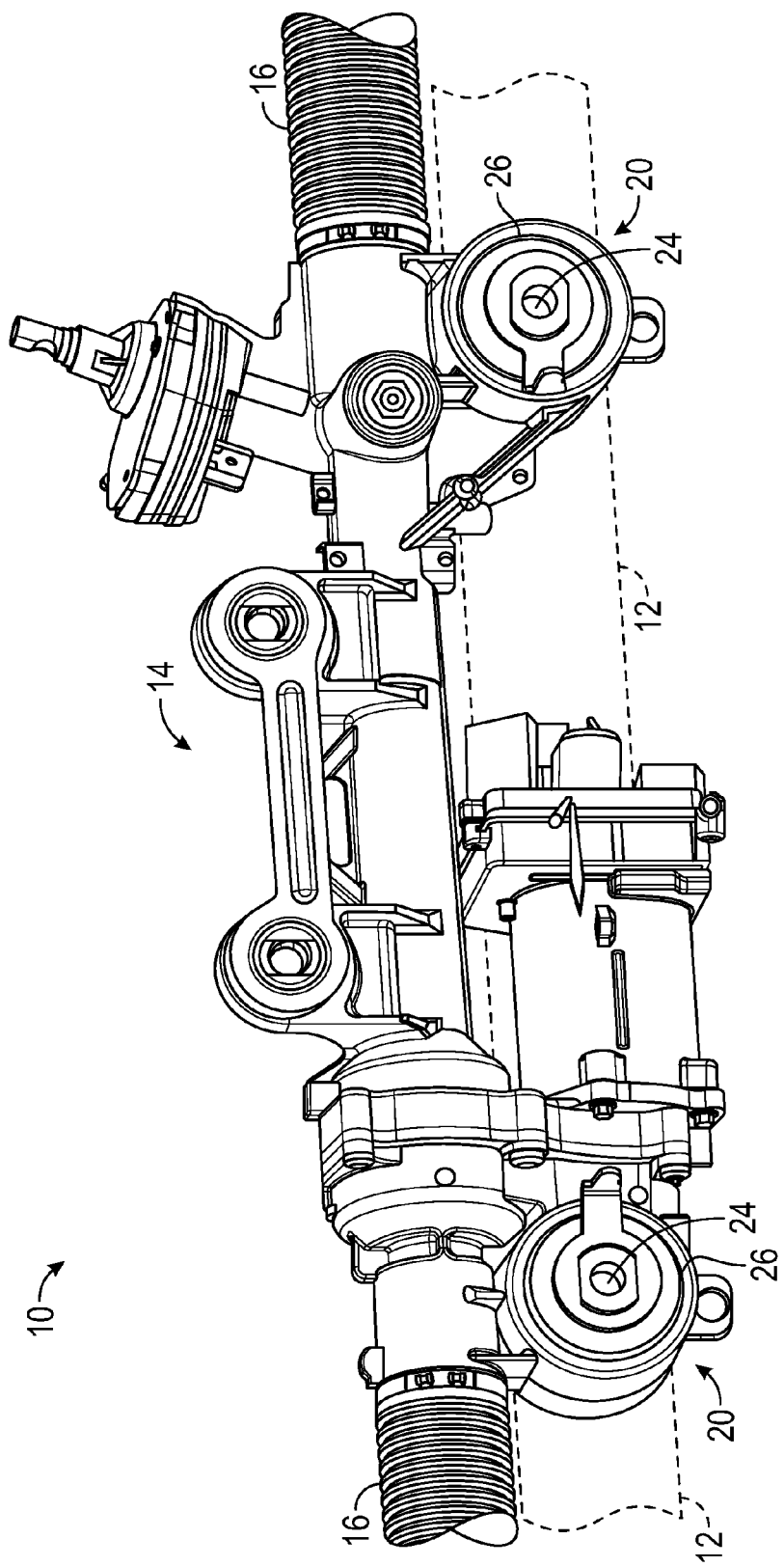
FIG. 1 is a schematic, isometric view of a portion of a steering assembly for a vehicle.

Referring to the drawings, wherein like reference numbers correspond to like or similar components whenever possible throughout the several figures, there is shown in FIG. 1 a portion of a vehicle (not numbered). In particular, FIG. 1 shows a steering assembly 10 for the vehicle. A frame 12 is schematically shown in FIG. 1 and broadly illustrates the structural chassis elements to which the steering assembly 10 is mounted.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

A rack-and-pinion steering gear 14 translates rotational movement of a steering wheel (not shown) into lateral movement of a pair of tie rods 16. In the configuration illustrated in FIG. 1, the steering gear 14 is a power steering gear and includes an electric motor (not numbered) that selectively amplifies forces transferred to the tie rods 16. Although the steering assembly 10 is illustrated as rack-and-pinion, other configurations may alternatively be utilized within the scope of the disclosure herein.

The steering gear 14 is mounted to the frame 12 via first and second bushings 20. One or more bolts 24 fixedly attaches each bushing 20 to the frame 12, such that the bushings 20 selectively provide varying degrees of relative movement between the frame 12 and the steering gear 14. The first and second (or left and right) bushings 20 may be substantially identical, mirrored, or tailored to specific characteristics of each side.

An outer housing or can 26 encapsulates the interior of the bushings 20. The can 26 may be pressed, welded, adhered, or otherwise solidly attached to the steering gear 14.

Figure 2:
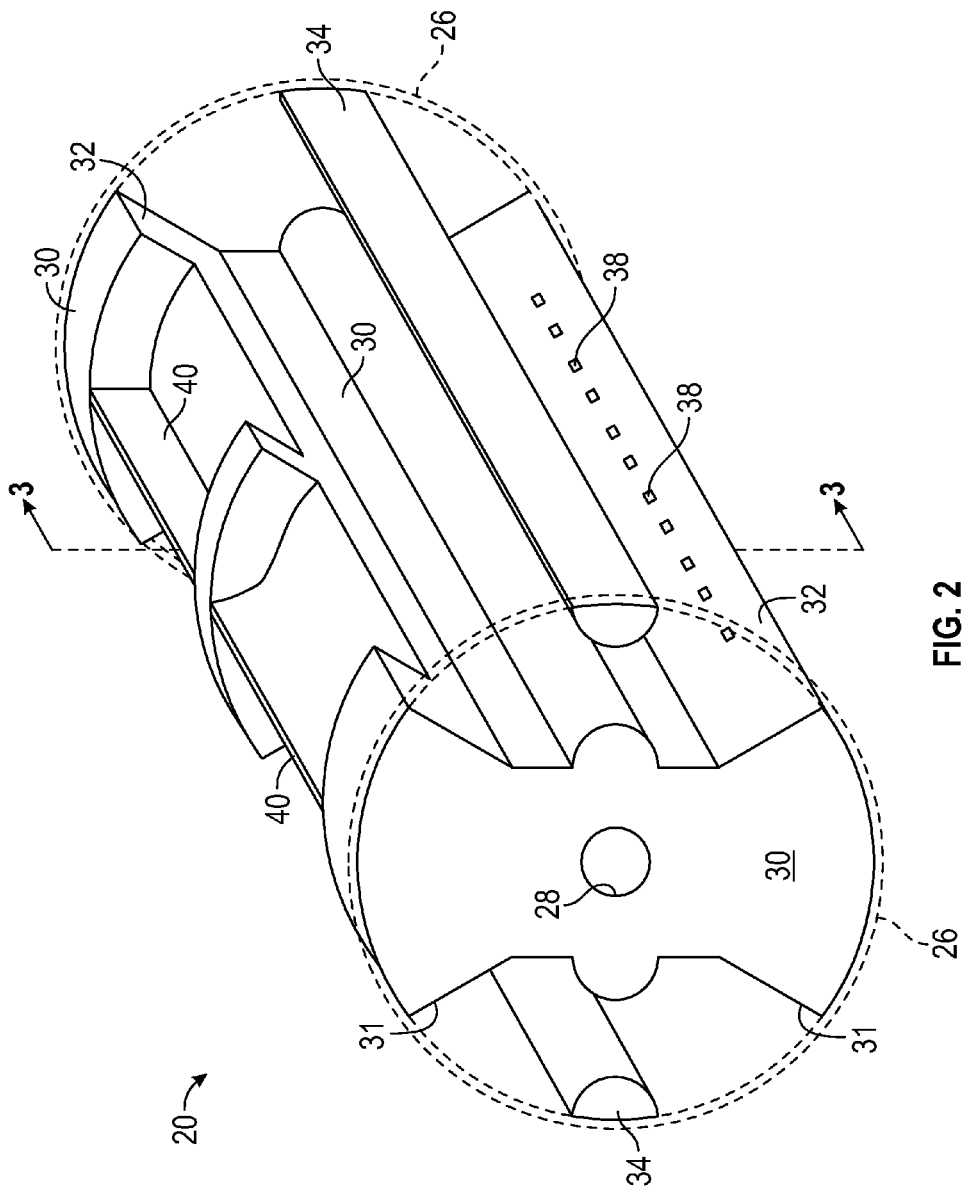
FIG. 2 is a schematic, isometric view of a hydraulic bushing that may be used to mount the steering assembly to a frame of the vehicle.

Referring now to FIG. 2, and with continued reference to FIG. 1, there is shown an isometric view of one of the bushings 20. FIG. 2 illustrates the interior portions of the bushing 20 with the can 26 shown only in phantom and with end caps hidden from view. Note that the bushing 20 is shown in generally the same orientation as FIG. 1, such that the vertical axis in both figures generally represents movement upward and downward relative to the vehicle and the horizontal axis generally represents lateral movement.

A mount hole 28 cooperates with the bolt 24 to mount the bushing 20—and, therefore, the steering gear 14—to the frame 12. A body 30 provides the structural support between the mount hole 28 and the can 26. In some configurations, the body 30 may be made of elastomeric rubber. For example, and without limitation, for applications in larger vehicles, such as full size pickup trucks, the body 30 may have a durometer generally between 400-800 newtons per millimeter (N/mm). However, other vehicles may have durometer ranges from 200 to 50,000 N/mm.

A first chamber or first cavity 31 and a second chamber or second cavity 32 are formed between the body 30 and the can 26. The first cavity 31 and the second cavity 32 are filled with a fluid—generally an incompressible fluid—such that the bushing 20 may be referred to as a hydraulic bushing.

On the left and right sides of the bushing 20 are snubbers 34, which may be attached to the can 26. The snubbers 34 define or limit the amount of lateral travel that may occur between the body 30 and the can 26. Therefore, the snubbers 34 may be tuned to control the displacement between the frame 12 (via the bolt 24) and the steering gear 14 (via its attachment to the can 26).

As lateral loads are introduced between the steering gear 14, such as by the tie rods 16, and the frame 12, the body 30 of the bushing 20 attempts to flex and come into contact with the snubbers 34. However, because the first cavity 31 and the second cavity 32 are filled with fluid, displacement of the body 30 is limited unless the fluid can freely move between the first cavity 31 and the second cavity 32.

Figure 3A:
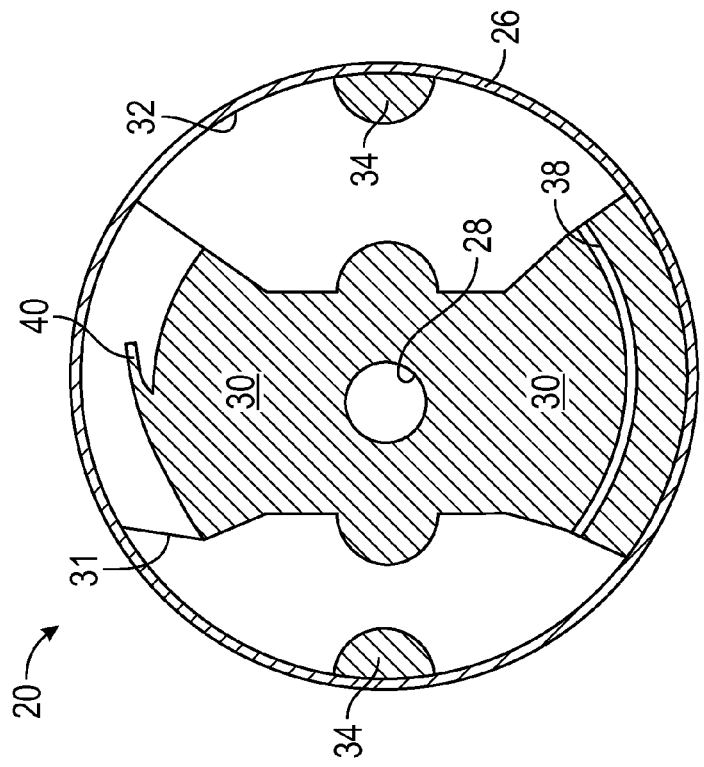
FIG. 3A is a schematic, cross-sectional view of the bushing illustrated in FIG. 2, taken generally along line 3-3 of FIG. 2, showing the bushing in a closed state.
Figure 3B:
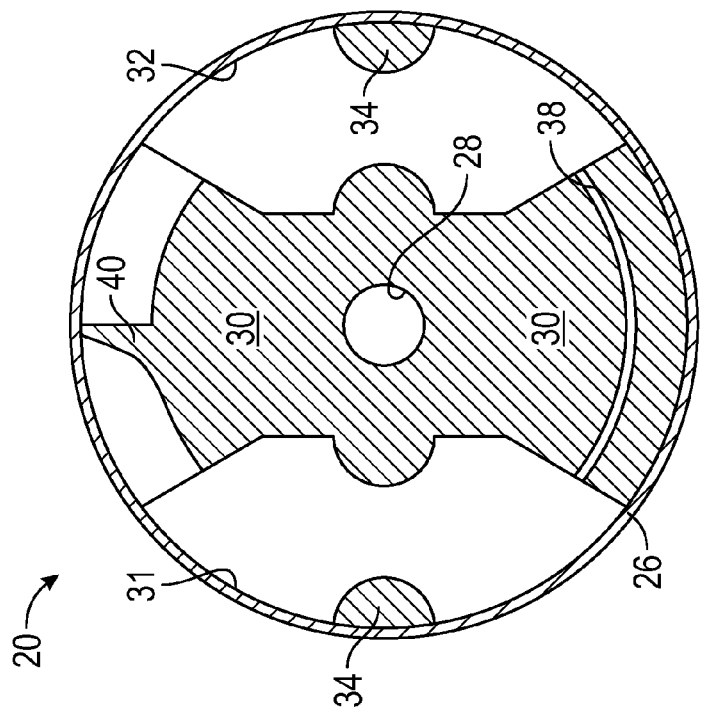
FIG. 3B is a schematic, cross-sectional view of the bushing illustrated in FIG. 3A, showing the bushing in an open state.

Referring also to FIG. 3A and FIG. 3B, and with continued reference to FIGS. 1-2, there are shown cross-sectional views of the bushing 20 taken generally along a line 3-3 of FIG. 2. FIG. 3A shows the bushing 20 in a closed state, such that flow is limited between the first cavity 31 and the second cavity 32. FIG. 3B shows the bushing 20 in an open state, such that maximum flow is allowed between the first cavity 31 and the second cavity 32.

A plurality of inertia tracks 38 link the first cavity 31 and the second cavity 32. The inertia tracks 38 are relatively narrow pathways between the first cavity 31 and the second cavity 32 and allow small amounts of fluid to pass between the first cavity 31 and the second cavity 32 at low flow rates.

In the configuration shown, each of the inertia tracks 38 is substantially the same size and passes through the body 30 along a planar arc, such that the whole inertia track 38 is viewable in FIGS. 3A and 3B. However, the inertia tracks 38 may also be lengthened or stretched by passing through the body 30 at an angle relative to the view plane of FIGS. 3A and 3B. The inertia tracks 38 are illustrated at the bottom of the bushing 20, but may be located at the top.

The inertia tracks 38 are always open, such that fluid may move back and forth to allow slight lateral movement of the body 30 within the can 26. However, because the inertia tracks 38 are narrow, the inertia tracks 38 will not allow large, fast displacements of the body 30. Under steady state loads, the inertia tracks 38 allow equalization of pressure within the fluid in the first cavity 31 and the second cavity 32.

The inertia tracks 38 may be tuned to allow specific frequencies and amplitudes of displacement of the body 30. The track length, width and number of inertia tracks 38 can be tuned to allow certain frequencies and force amplitudes to be dampened or cancelled by the bushing 20.

One specific benefit of the inertia tracks 38 of the bushing 20 is the ability to attenuate or eliminate smooth road shake (SRS) vibrations of the vehicle. In some vehicles driving at highway speeds, tire or wheel imbalances may cause smooth road shake at between 10-18 Hz vibration. Smooth road shake is often felt in the floor or seat (or both) of the vehicle, which may be bothersome to the operator of the vehicle. The inertia tracks 38 may be tuned to attenuate smooth road shake for the specific vehicle into which the bushings 20 will be placed.

At least one pressure valve 40 divides the first cavity 31 and the second cavity 32. In FIG. 3A, the pressure valve 40 is shown in a closed or un-actuated state. In FIG. 3B, the pressure valve 40 is shown in an open or actuated state. While the inertia tracks 38 always allow low flow rates between the first cavity 31 and the second cavity 32, the pressure valve 40 selectively allows high flow rates between first cavity 31 and the second cavity 32.

As best illustrated in FIG. 2, the bushing 20 includes two pressure valves 40, one tending to open to the left, such that it promotes flow from the second cavity 32 to the first cavity 31, and one tending to open to the right, such that it promotes flow from the first cavity 31 to the second cavity 32. The viewpoint of FIG. 3B taken through the pressure valve 40 tending to open toward the right.

In the closed state, as illustrated in FIG. 3A, the pressure valve 40 is subjected to pressure differentials below a cracking threshold. This occurs while the bushing 20 is subjected to lateral loads between the frame 12 and the steering gear 14 below a lateral threshold. During such relatively low, or steady-state, loading conditions, fluid flow through the inertia tracks 38 is sufficient to prevent fluid pressure build up in either the first cavity 31 or the second cavity 32 from reaching the cracking threshold of the pressure valve 40.

In the open state, as illustrated in FIG. 3B, the pressure valve 40 is subjected to a pressure differential greater than the cracking threshold. The opened pressure valve 40 creates a long, relatively wide opening between the first cavity 31 or the second cavity 32. This situation occurs when the bushing 20 is subjected to lateral loads between the frame 12 and the steering gear 14 above the lateral threshold.

For example, during cornering of the vehicle, the tie rods 16 introduce lateral loads between the steering gear 14 and the frame 12, which bias the body 30 laterally within the can 26. If these loads cause pressure differentials to exceed the cracking threshold, the pressure valve 40 will open. The high flow rate between the first cavity 31 or the second cavity 32 while the pressure valve 40 is open allows the body 30 to quickly move laterally until it makes contact with the snubbers 34.

The pressure valve 40 may be tuned to open during pressure buildup of specific lateral loads. In particular, the pressure valve 40 may open under laterals loads that are greater than those introduced by smooth road shake or similar, very low force, vibrations.

For hydraulic bushings located elsewhere on the vehicle, or for alternative (high cracking) configurations of bushing 20, over-pressure valves may be configured to open or actuate at very high loads. Such over-pressure valves actuate only during extreme loading conditions expected to occur a handful of times during the operating life of the vehicle. For example, over-pressure valves in a hydraulic bushing located elsewhere on the vehicle may be configured to open when the bushing is subjected to greater than 30 kilonewtons (kN) of lateral force.

Contrarily, the pressure valves 40 of the bushing 20 are configured to open at significantly lower lateral loading conditions, such that one of the pressure valves is open at all loads greater than those introduced by smooth road shake and other low-level vibrations. For example, and without limitation, the bushings 20 mounting the steering gear 14 to the frame 12 may be configured such that the pressure valves 40 open at as low as 1 kN of lateral force. Therefore, the pressure valves 40 are open under relatively low loads, and are often open while the vehicle is operating, such as those occurring under minor corning or steering loads applied to the steering gear 14.

The displacement of the body 30 within the bushing 20 may be configured to allow, or create, understeer during cornering of the vehicle. For example, the body 30 and the snubbers 34 may be configured to allow between 4-7 millimeters of lateral displacement to either the left or the right. This lateral movement between the frame 12 and the steering gear 14 assists in causing the vehicle to understeer.

Note that the area opened by either of the pressure valves 40 is significantly greater than the total area of the inertia tracks 38. Furthermore, the length of the inertia tracks 38 contributes drag to fluid flowing there through, but fluid flowing passed the open pressure valves 40 is significantly less constricted. Each of the pressure valves 40 may have an area (i.e., a cross-sectional area though which fluid is capable of flowing when open) that is at least twice the combined area of the inertia tracks 38.

The detailed description and the drawings or figures are supportive and descriptive of the subject matter discussed herein. While some of the best modes and other embodiments have been described in detail, various alternative designs, configurations, and embodiments exist.

The invention claimed is:

1. A steering assembly for a vehicle, the steering assembly comprising:
   a frame member;
   a steering gear;
   at least one bushing mounting the steering gear to the frame member, wherein the bushing is filled with a fluid and includes:
   a housing;
   a central body within the housing;
   a first cavity defined between the central body and the housing;
   a second cavity defined between the central body and the housing;
   an inertia track providing uninterrupted fluid communication between the first cavity and the second cavity;
   a pressure valve separating the first cavity and the second cavity, wherein the pressure valve is movable between an open position, which allows fluid communication through the pressure valve between the first cavity and the second cavity, and a closed position, which blocks fluid communication through the pressure valve between the first cavity and the second cavity.

2. The steering assembly of claim 1, wherein the pressure valve is biased toward the closed position.

3. The steering assembly of claim 2, wherein the pressure valve is a first pressure valve configured to open toward a first lateral direction, and further comprising:
   a second pressure valve configured to open toward a second lateral direction opposite the first lateral direction, such that the first pressure valve and the second lateral valve open in opposing directions.

4. The steering assembly of claim 3, further comprising:
   a plurality of inertia tracks, wherein the total area of the plurality of inertia tracks is less than half the area of the first pressure valve or the second pressure valve.

5. The steering assembly of claim 1, further comprising:
   a plurality of inertia tracks, wherein the total area of the plurality of inertia tracks is less than half the area of the first pressure valve.

6. A steering assembly for a vehicle, the steering assembly comprising:
   a frame member;
   a steering gear; and
   a first bushing mounting the steering gear to the frame member, wherein the first bushing is filled with a fluid and includes:
   a housing;
   a central body operatively attached to the housing;
   a first cavity defined between the central body and the housing;
   a second cavity defined between the central body and the housing;
   an inertia track defined in the central body providing uninterrupted fluid communication between the first cavity and the second cavity;
   a first pressure valve separating the first cavity and the second cavity, wherein the first pressure valve is movable between an open position, which allows fluid communication through the first pressure valve from the first cavity into the second cavity during loads greater than smooth road shake, and a closed position, which blocks fluid communication through the first pressure valve between the first cavity and the second cavity during loads induced by smooth road shake; and
   a second pressure valve separating the first cavity and the second cavity, wherein the second pressure valve is movable between an open position, which allows fluid communication through the second pressure valve from the second cavity into the first cavity during loads greater than smooth road shake, and a closed position, which blocks fluid communication through the second pressure valve between the second cavity and the first cavity during loads induced by smooth road shake.

7. The steering assembly of claim 6, further comprising:
   a plurality of inertia tracks defined in the central body of the first bushing, wherein the total area of the plurality of inertia tracks is less than half the area of one of the first pressure valve and the second pressure valve.

8. The steering assembly of claim 7, further comprising:
   a second bushing mounting the steering gear to the frame member, wherein the second bushing is filled with a fluid and includes:
   a housing;
   a central body operatively attached to the housing;
   a first cavity defined between the central body and the housing;
   a second cavity defined between the central body and the housing;
   an inertia track defined in the central body providing uninterrupted fluid communication between the first cavity and the second cavity;
   a first pressure valve separating the first cavity and the second cavity, wherein the first pressure valve is movable between an open position, which allows fluid communication through the first pressure valve from the first cavity into the second cavity during loads greater than smooth road shake, and a closed position, which blocks fluid communication through the first pressure valve between the first cavity and the second cavity during loads induced by smooth road shake; and
   a second pressure valve separating the first cavity and the second cavity, wherein the second pressure valve is movable between an open position, which allows fluid communication through the second pressure valve from the second cavity into the first cavity during loads greater than smooth road shake, and a closed position, which blocks fluid communication through the second pressure valve between the second cavity and the first cavity during loads induced by smooth road shake.

* * * * *